Figure 1:
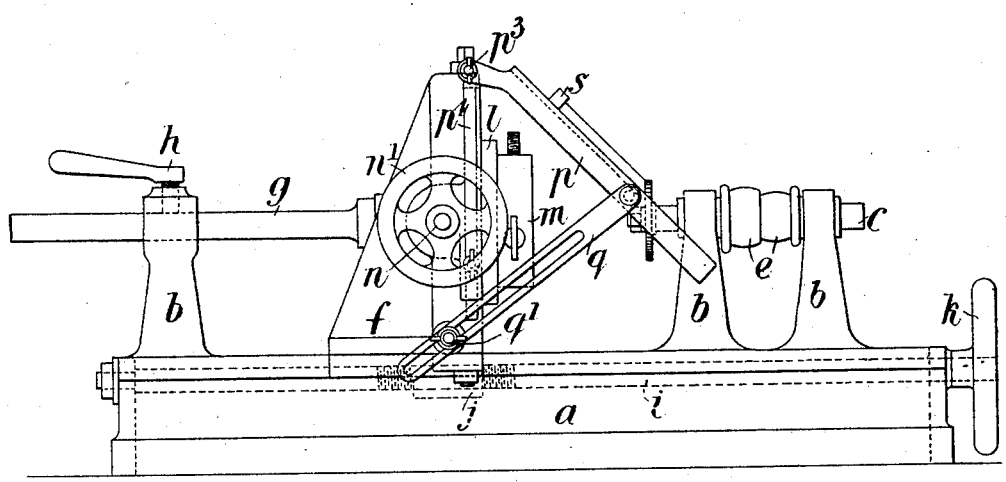

No. 612,882. Patented Oct. 25, 1898.
J. UNWIN.
CARVING AND MOLDING MACHINERY FOR WOOD.
(Application filed Sept. 7, 1897. Renewed Sept. 6, 1898.)

(No Model.) 2 Sheets—Sheet 1.

Witnesses.

Inventor.

No. 612,882. Patented Oct. 25, 1898.
J. UNWIN.
CARVING AND MOLDING MACHINERY FOR WOOD.
(Application filed Sept. 7, 1897. Renewed Sept. 6, 1898.)
(No Model.) 2 Sheets—Sheet 2.
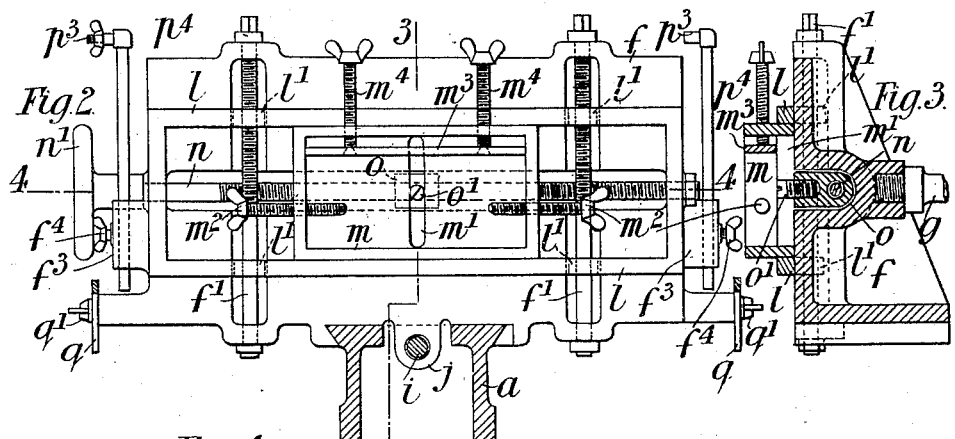
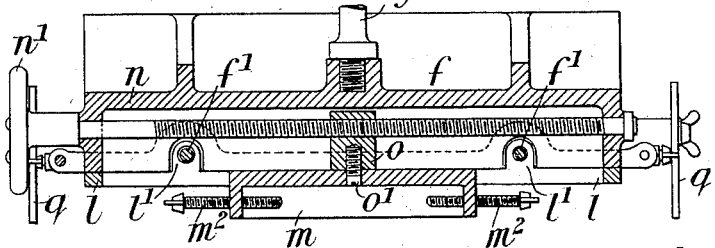
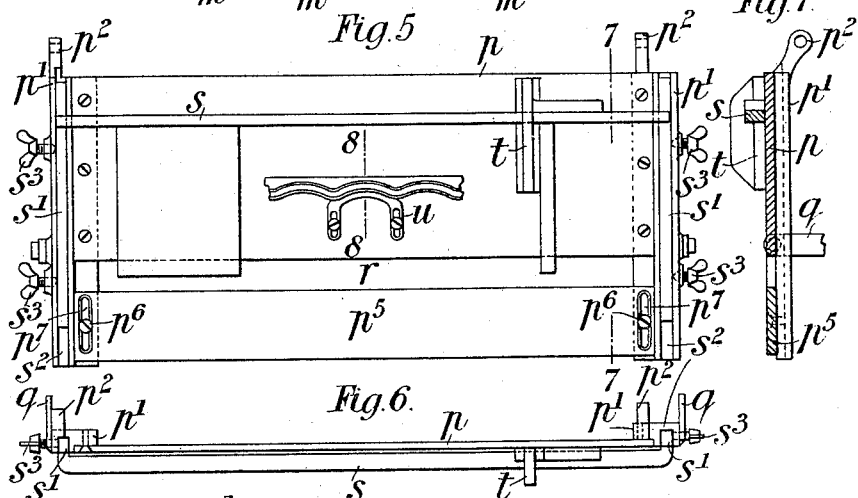
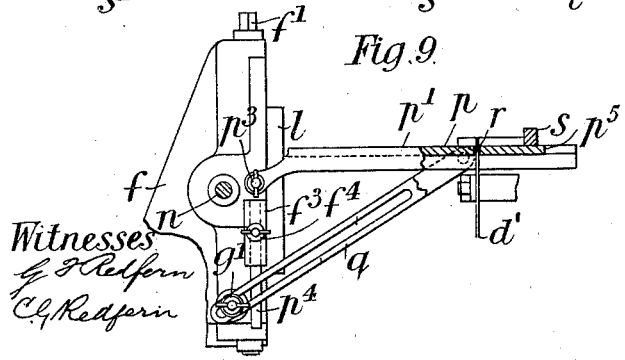
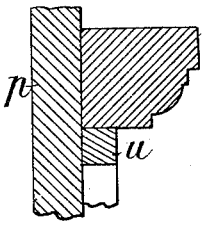
Witnesses
Inventor
J. Unwin
THE NORRIS PETERS CO., PHOTO-LITHO., WASHINGTON, D. C.

UNITED STATES PATENT OFFICE.

JOHN UNWIN, OF LONDON, ENGLAND.

CARVING AND MOLDING MACHINERY FOR WOOD.

SPECIFICATION forming part of Letters Patent No. 612,882, dated October 25, 1898.

Application filed September 7, 1897. Renewed September 6, 1898. Serial No. 690,358. (No model.)

*To all whom it may concern:*

Be it known that I, JOHN UNWIN, a subject of the Queen of Great Britain, residing at London, England, have invented new and useful Improvements in Carving and Molding Machinery for Wood and the Like, of which the following is a specification.

This invention relates to improvements in machinery for carving and molding wood and the like, and has for its object to provide a machine which is more simple in construction than ordinary machines of this type and by means of which work can be performed more quickly than with such machines as now generally used.

According to my invention I provide a bed to which are secured a number of uprights for receiving the driving-spindle for the cutters and a guide-spindle secured to a sliding block. This sliding block is provided with means, such as a screw, whereby it can be moved longitudinally on the bed and also with guide-bars forming a frame in which slides a second frame for gripping the work. The guide-bars are provided with means whereby they can be raised and lowered. The sliding frame is advantageously actuated by means of a screw and is so constructed that it can be adjusted to suit work of varying dimensions. In connection with the sliding block I provide a plate adapted to be hinged to the said sliding block on hinges which can be adjusted vertically and which plate can be held at any inclination by suitable means. The plate is advantageously formed of a frame in which is fitted a face-plate to which gages can be secured when the plate is to be used for molding purposes and which can provide a slit for the cutter or saw.

To enable my invention to be fully understood, I will describe it by reference to the accompanying drawings, in which—

Figure 1 is a side elevation of a wood carving and molding machine constructed according to my invention. Fig. 2 is a front elevation of the sliding block shown in position upon the bed-plate. Fig. 3 is a section on the line 3 3, Fig. 2. Fig. 4 is a section on the line 4 4, Fig. 2. Fig. 5 is a front elevation of the hinged plate. Fig. 6 is a plan of the same. Fig. 7 is a section on the line 7 7, Fig. 5. Fig. 8 is a section on the line 8 8, Fig. 5, the said section being drawn to a larger scale; and Fig. 9 is a side sectional elevation of the sliding block and hinged plate arranged as a saw-bench.

$a$ is the bed of the machine, and $b\ b\ b$ the uprights fitted thereto.

$c$ is the driving-spindle for the cutter or saw, (a cutter is shown at $d$, Fig. 1,) the said spindle $c$ being provided with pulleys $e\ e$ for driving purposes.

$f$ is the sliding block arranged upon the bed $a$. $g$ is the guide-spindle attached to the said block and arranged to be supported in one of the uprights $b$, and $h$ is a set-screw by means of which the spindle $g$ can be secured in any position in the said upright $b$.

$i$ is the screw for longitudinally adjusting the position of the sliding block $f$ upon the bed $a$, the said screw passing through a nut $j$ on the under side of the sliding block $f$ and being provided with a hand-wheel $k$.

$l\ l$ are the guide-bars forming a frame, the said frame being provided with lugs $l'\ l'$, through which pass spindles $f'\ f'$, rotatably mounted in the sliding block $f$ and screw-threaded at their upper ends, the upper lugs $l'\ l'$ being also internally screw-threaded to receive the screw-threaded spindles $f'\ f'$. By turning these spindles $f'\ f'$, therefore, it will be obvious that the frame $l$ is caused to slide up or down upon the face of the sliding block $f$.

$m$ is the sliding frame for gripping work to be carved, which frame slides horizontally between the guide-bars $l\ l$, the horizontal movement of the said frame $m$ being effected by means of the screw $n$, which is provided with a hand-wheel $n'$ and passes through a nut $o$, having a pin $o'$, which engages in a vertical slot $m'$ in the frame $m$. With this construction it will be obvious that by turning the hand-wheel $n'$ the nut $o$, and therefore the frame $m$, will be caused to move horizontally in the frame $l$.

For gripping the work in the frame $m$ I provide the latter with lateral screws $m^2\ m^2$ and with a plate or bar $m^3$, which can be adjusted vertically by screws $m^4\ m^4$.

With this construction of sliding block and work-frame it will be obvious that work differing considerably in size can be secured in the frame and that the work can be moved vertically by the screws $f'f'$ and horizontally by the sliding frame $m$ through the medium of the hand-wheel $n'$.

$p$ is the plate which I use in conjunction with my sliding block for supporting work to be mitered, beveled, molded, fluted, or the like, the said plate being fixed upon a frame or support $p'$, provided at its upper end with lugs $p^2 p^2$, adapted to be suspended upon pins $p^3 p^3$, fitted to the upper ends of bars or rods $p^4 p^4$, which slide in lateral guides $f^3$ upon the sliding block $f$, set-screws $f^4 f^4$ being provided for securing the sliding bars $p^4$ in any desired position in the said guides, so that the plate $p$ is supported on hinges which are adjustable vertically. To hold the plate $p$ at different inclinations to the face of the sliding block, I provide slotted bars $q$, hinged at one end to the plate $p$ and held at their other ends by screws $q'$, which pass through the slots, so as to secure the bars $q$ to the sliding block $f$. To adjust the inclination of the plate $p$, it will be obvious that it is only necessary to loosen the screw $q'$, slide the bars $q$ thereon until the desired inclination is obtained, and to then tighten the screws $q'$.

The lower portion $p^5$ of the plate $p$ is made to slide upon the frame $p'$ and can be adjusted by means of screws $p^6$, which work in slots $p^7$ in the said plate, so as to provide a slit $r$ of varying breadth between the upper and lower portions $p$ and $p^5$ of the plate, the said slit $r$ being provided for the passage of a cutter or saw. The plate $p$ is provided with suitable work guides or gages $s\,t\,u$. The guide $s$, which consists of a bar crossing the plate $p$, can move up and down upon the said plate by means of guide-bars $s' s'$, which move in grooves $s^2 s^2$ upon the frame $p'$ and can be secured in any desired position therein by means of set-screws $s^3 s^3$. The guide $t$ is arranged to move upon the guide-bar $s$. The guide-bar $u$ consists of a curved plate which can be adjusted in position by means of screws and slots, as shown in Fig. 5, and is designed for use when it is desired to cut molding such as that shown in Figs. 5 and 8—that is to say, molding having a wavy outline.

The method of employing my hinged plate for cutting miters and the like is shown in Fig. 1, the said plate $p$ being fixed at a suitable inclination and the cutter $d$ projecting above its lower edge, the plate $p^5$ being removed. By removing the frame $m$ and fixing the plate $p$ vertically I can cut moldings or flutes.

In Fig. 9 I have shown the plate $p$ and sliding block $f$ arranged as a saw-bench. In this case the plate $p$ is secured in a horizontal position, and the strip $p^5$ of the plate is adjusted so as to leave a slit $r$ of just sufficient width to take a circular saw $d'$. In this case the guide $s$ is preferably reversed in position on the plate $p$, as shown.

Having now particularly described and ascertained the nature of my said invention and in what manner the same is to be performed, I declare that what I claim is—

1. The combination with the bed, of a cutter-shaft mounted in stationary bearings thereon, the sliding block having a vertical face, means for adjusting said block toward and from the cutter, a vertically-movable frame secured to the vertical face of said block, means for adjusting said frame vertically, a horizontally-movable work-holding frame in said vertically-movable frame and means for adjusting said work-holding frame horizontally, substantially as described.

2. The combination with the bed, of a cutter-shaft mounted in stationary bearings thereon, the sliding block having a face perpendicular to said shaft, means for adjusting said block toward and from the shaft, a vertically-sliding frame secured to the perpendicular face of said block, adjusting devices secured to said block and engaging said frame, a work-holding frame adapted to slide horizontally in said vertically-movable frame, and adjusting devices on said block for engaging and adjusting said work-holding frame, substantially as described.

3. The combination with the bed, of a cutter-shaft mounted thereon, the sliding block adjustable toward and from said shaft and provided with a vertical face, a vertically-movable frame engaging said vertical face and provided with lugs extending into said block, vertical adjustable screw-shafts mounted in said block and engaging said lugs, a horizontally-movable work-holding frame in said vertically-movable frame provided with a vertical slot, a horizontal adjusting screw-shaft in said block provided with a nut having a part engaging the slot in said work-holding frame, for adjusting the same horizontally, substantially as described.

4. The combination with the bed, a cutter-shaft mounted in stationary bearings, the sliding block provided with lateral vertical guides and means for adjusting said block toward and from the cutter-shaft, of a work-holding plate provided at one end with supporting-rods pivotally connected thereto and adapted to engage the lateral guides on said block, adjustable securing devices for securing said rods at different elevations and adjustable supporting-arms connected to said plate adjacent to the other end of the same and secured to said block, substantially as described.

5. The combination with the bed, of a cutter-shaft mounted thereon in stationary bearings, a sliding block on said bed adjustable toward and from the cutter-shaft, and provided with a vertical face, a vertically and horizontally adjustable work-supporting frame on said face, an auxiliary work-supporting plate having one edge secured to said block by vertically-adjustable devices and provided with adjustable arms extending from said block to portions of said plate adjacent to its opposite edge, adjustable work-gages on said plate, and a removable plate supported in the plane of said work-supporting plate and adjustable toward and from the same to form a slot of varying width through which the cutter on said cutter-shaft may project, substantially as described.

JOHN UNWIN.

Witnesses:
 G. F. REDFERN,
 C. G. REDFERN.